US012501226B2

(12) United States Patent
Hong et al.

(10) Patent No.: US 12,501,226 B2
(45) Date of Patent: Dec. 16, 2025

(54) CONTENT BASED STEREO SIGNAL PROCESSING

(71) Applicant: Rivian IP Holdings, LLC, Plymouth, MI (US)

(72) Inventors: Jung Wook Hong, Irvine, CA (US); Janhavi Shriniwas Agashe, San Jose, CA (US); Ian Eric Esten, Woodside, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 371 days.

(21) Appl. No.: 18/183,388

(22) Filed: Mar. 14, 2023

(65) Prior Publication Data

US 2024/0314508 A1 Sep. 19, 2024

(51) Int. Cl.
*H04S 3/00* (2006.01)

(52) U.S. Cl.
CPC .......... *H04S 3/008* (2013.01); *H04R 2499/13* (2013.01)

(58) Field of Classification Search
CPC ........ H04S 3/008; H04S 2400/07; H04S 7/30; H04S 3/00; H04R 2499/13
USPC .......................................................... 381/86
See application file for complete search history.

(56) References Cited

U.S. PATENT DOCUMENTS

| | | | | |
|---|---|---|---|---|
| 2011/0270955 A1* | 11/2011 | Baldini | ............. | H04N 21/8113 709/219 |
| 2022/0070584 A1* | 3/2022 | Christensen | ............. | H04R 3/12 |

FOREIGN PATENT DOCUMENTS

| | | | | |
|---|---|---|---|---|
| JP | 2010103768 | * 5/2010 | ............. | G10L 19/02 |
| WO | WO 2004068730 | * 12/2004 | ............... | H04B 1/00 |

* cited by examiner

*Primary Examiner* — Yosef K Laekemariam
(74) *Attorney, Agent, or Firm* — Foley & Lardner LLP

(57) ABSTRACT

The present solution can provide content based stereo signal processing for an audio system, such as an audio system of a vehicle. An audio system can include one or more processors of a data processing system coupled with memory to identify a stereo signal of an audio system of a vehicle. The one or more processors can determine a factor indicative of correlation between a first portion of the stereo signal and a second portion of the stereo signal. The one or more processors can select, based on the factor, a setting for generating a plurality of audio signals. The audio system can include a decorrelation circuit to generate, based on the stereo signal and according to the setting, the plurality of audio signals for a plurality of speakers in the vehicle.

15 Claims, 5 Drawing Sheets

CONTENT BASED STEREO SIGNAL PROCESSING

INTRODUCTION

Vehicles, such as electric vehicles (EVs), can include sound systems that play audio content to drivers and passengers of the vehicle. Audio content, such as radio programs, podcasts or musical recordings, can be played over the speakers of the vehicle.

SUMMARY

This disclosure is directed to a vehicle sound or audio system providing adaptive processing or mixing of incoming audio signal based on the incoming signal's content characteristics. Automotive signal mixing (e.g., up-mixing or down-mixing) is conventionally limited to a single static or preset signal mixing processing setting for all incoming audio content. As a result, various types of audio content can be played at a substandard sound quality not suitable for the given content. The present solution addresses this shortcoming by providing a data processing system to generate correlation factors or settings for a decorrelation circuit or a filter whose signal mixing settings can be adjusted to process (e.g., mix) the incoming audio signal based on the signal's content characteristics or metadata indicative of the content recording type. The present solution allows the decorrelation circuit to adjust its settings for signal processing according to the audio signal content, thereby improving the sound quality for a variety of types of audio material played over the vehicle's sound system.

An aspect can be directed to an audio system in a vehicle. The audio system can include one or more processors of a data processing system coupled with memory. The one or more processors can identify a stereo signal of an audio system of a vehicle. The one or more processors can determine a factor indicative of correlation between a first portion of the stereo signal and a second portion of the stereo signal. The one or more processors can select, based on the factor, a setting for generating a plurality of audio signals. The audio system can include a decorrelation circuit to generate, based on the stereo signal and according to the setting, the plurality of audio signals for a plurality of speakers in the vehicle.

An aspect of the present disclosure can be directed to a method of content based processing of an audio signal. The method can include identifying, by a data processing system, a stereo signal of a vehicle. The method can include determining, by the data processing system, a factor indicative of correlation between a first portion of the stereo signal and a second portion of the stereo signal. The method can include selecting, by the data processing system based on the factor, a setting for generating a plurality of audio signals. The method can include generating, by a decorrelation circuit based on the stereo signal and according to the setting, the plurality of audio signals for a plurality of speakers in the vehicle.

An aspect of the present disclosure can be directed to a vehicle. The vehicle can include an audio system of a vehicle comprising one or more processors coupled with memory. The one or more processors can identify a stereo signal of an audio system of a vehicle. The one or more processors can determine a factor indicative of correlation between a first portion of the stereo signal and a second portion of the stereo signal. The one or more processors can select, based on the factor, a setting for generating a plurality of audio signals.

The audio system can include a decorrelation circuit to generate, based on the stereo signal and according to the setting, the plurality of audio signals. The audio system can include a plurality of speaker in the vehicle to provide sound according to the plurality of audio signals.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for content based processing of a stereo signal. The various concepts introduced above and discussed in greater detail below may be implemented in any of numerous ways.

This disclosure is generally directed to a vehicle audio system providing adaptive signal mixing based on characteristics of the incoming stereo signal. Automotive signal processing (e.g., up-mixing or down-mixing) can be generally limited to static or manually preset settings for signal mixing processing that remains unchanged for all incoming audio content, regardless of the content type or characteristics. This limitation can lead to some audio content being played by the audio system at a substandard quality or performance level that would be the case if the setting was adjusted for the particular content. The problem can be further exacerbated by the fact that a vehicle sound system can include further constraints, such as sound speakers being confined to set locations, making it even more difficult to provide high quality sound output while the vehicle is being used across various conditions or terrain.

The present solution provides a data processing system to monitor characteristics of the incoming stereo signal and generate correlation factors or settings for adjusting or configuring the operation (e.g., signal mixing) of the decorrelation circuit in accordance with the signal content characteristics or the metadata associated with the recording of the incoming signal. As a result, the present solution improves the quality of auditory experience for various types of audio material played over the audio system. For example, the present solution can use a data processing system that can include, provide or use machine learning to detect different genre or content using signal analysis or metadata. The present solution can determine or select settings suitable for the content of the incoming signal and can automatically set or reconfigure the decorrelation circuit to process the incoming stereo signal in accordance with the signal's content, metadata or features.

Figure 1:
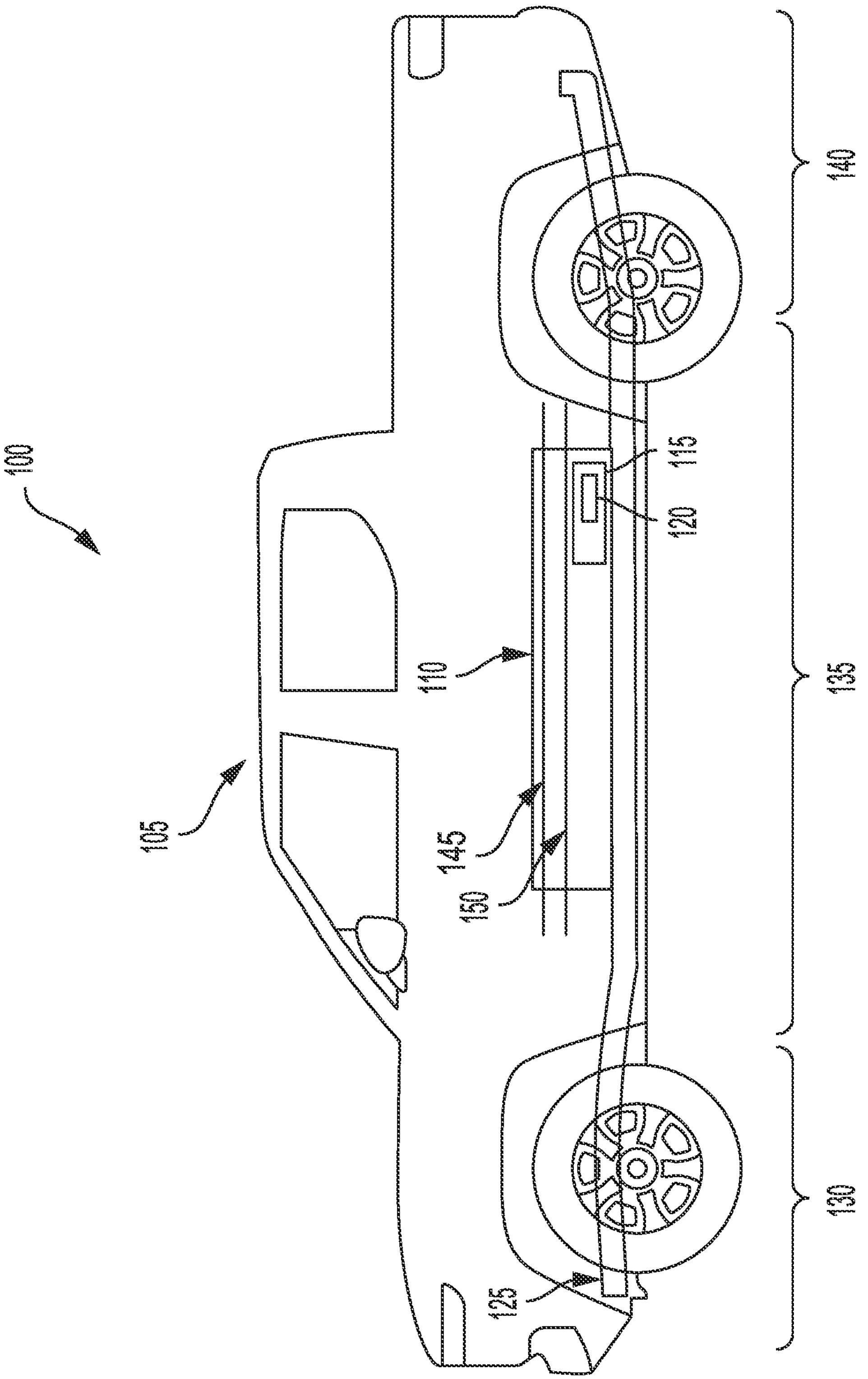
FIG. 1 depicts an example electric vehicle.

FIG. 1 depicts an example view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2:
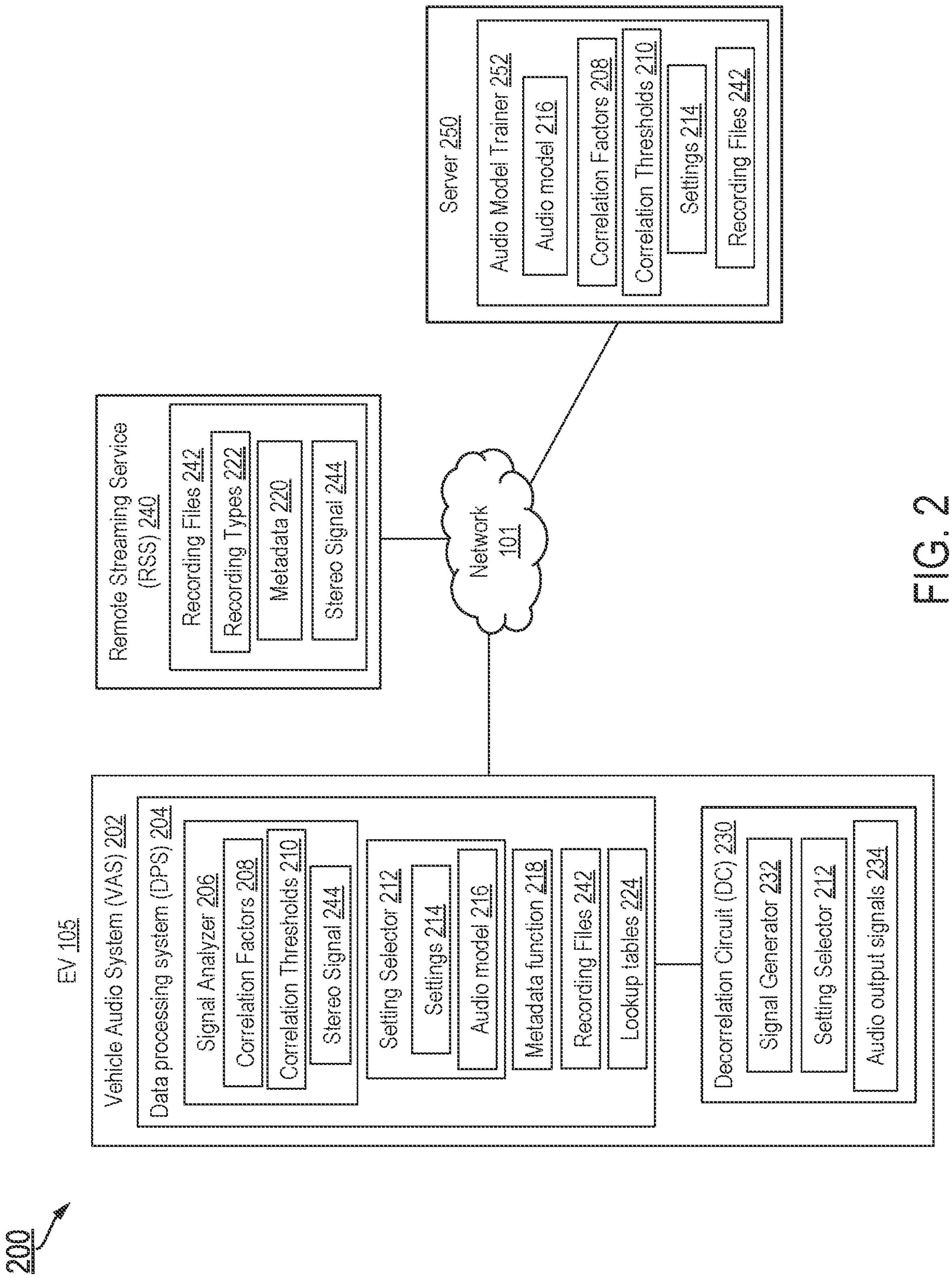
FIG. 2 depicts a block diagram of a system for content adaptive stereo signal processing.

FIG. 2 depicts an example system 200 for content adaptive stereo signal mixing of incoming audio signal. The example system 200 can include a vehicle audio system (VAS) 202 on an EV 105. VAS 202 can include a data processing system (DPS) 204 coupled with a decorrelation circuit (DC) 230. DPS 204 can include one or more signal analyzers 206 including, determining, selecting or providing correlation factors 208 and correlation thresholds 210. DPS 204 can include setting selector 212 including, determining, selecting or providing one or more settings 214 and audio models 216. DPS 204 can include one or more metadata functions 218, recording files 242 and lookup tables 224. DC 230 can include one or more signal generators 232, setting selectors 212 and audio output signals 234. Across the network 101, the EV 105 can communicate with a remote streaming service (RSS) 240 and a server 250. RSS 240 can include one or more recording files 242. Recording files 242 can include one or more recording types 222, metadata 220 and stereo signals 244 corresponding to the recording file 242. Server 250 can include an audio model trainer 252 training one or more audio models 216 and including one or more correlation factors 208, correlation thresholds 210, settings 214 and recording files 242.

The example system 200 can utilize a server 250 to use an audio model trainer 252 to train an audio model 216 using various training or input data, such as correlation factors 208, correlation thresholds, settings 214 and recording files 242. DPS 204 of an EV 102 can receive the audio model 216, via a network 101, from the server 250 and use the audio model 216 for content adaptive stereo signal processing. A user of a VAS 202 can access or stream, via a network 101, a recording file 242 provided by a remote streaming service 240. The recording file 242 (e.g., either live or pre-recorded) can include a streamed piece of classical music, podcast discussion or any other type of audio signal. DPS 204 can use a signal analyzer 206 to determine correlation factors 208 between two portions (e.g., channels) of the stereo signal 244. DPS 204 can compare the correlation factors 208 against one or more correlation thresholds 210 to determine the type of setting 214 to use for the decorrelation circuit 230. Depending on the design, DPS 204 or the DC 230 can utilize a setting selector 212 to determine a setting 214 for the signal generator 232 of the DC 230. Setting 214 can be selected based on, or using, the one or more correlation factors 208. In some embodiments, DPS 204 or the DC 230 can utilize an audio model 216 to determine the correlation factors 208 or settings 214 for the signal generator 232.

Using the example system 200, the signal generator 232 of the DC 230 can utilize the settings 214 to reset, reconfigure or adjust the operation of the DC 230 with respect to providing or generating of the audio output signals 234, which can then be further processed by the remainder of the VAS 202 in order to be played by speakers (e.g., 320) of the system in accordance with increased or enhanced sound quality. In doing so, the example system 200 can determine the level of correlation between the two parts of an incoming stereo signal 244 and update the decorrelation circuit settings 214 as needed, per content metadata or characteristics. The present solution can request metadata 220 via an application programming interface (API) call from a remote streaming service 240 and modify the settings 214 for the operation of the decorrelation circuit 230 based on the metadata 220 received from the streaming service 240 in response to the API call or request.

Vehicle audio system (VAS) 202 can include any combination of hardware and software for providing sound or audio output to a user (e.g., driver) of an EV 105. VAS 202 can include circuitry, processors, sound amplification devices or audio signal processing components or circuits (e.g., DC 230, Fourier transform circuit 302, amplitude adjustment circuit 304 or down mixer 306). VAS 202 can include transducers providing sound to the users (e.g., speakers 320) that can be designed to provide various frequency ranges of sound outputs. VAS 202 can include or be coupled with an audio or video based infotainment system of an EV 105 and can include, be coupled with, or utilize a computing device 500.

Data processing system (DPS) 204 can include any combination of hardware and software for processing, adjusting, controlling, generating, distributing or managing sound signals or a VAS 202. DPS 204 can be coupled with or include a computing device 500. DPS 204 can include one or more processors 510 for processing instructions stored in memories, such as main memory 515, ROM 520 or storage device 525. DPS 204 can execute instructions to implement actions or functionalities of the DPS 204 and communicate, via network 101, with any remote streaming service 240 or server 250. DPS 204 can be deployed anywhere on an EV 105, including for example, coupled with or deployed within a VAS 202. DPS 204 can be coupled with or included within, any part of the VAS 202, such as the DC 230, down mixer 306, amplitude adjustment circuit 304 or any other part of VAS 202. DPS 204 can include any functionality for processing audio signals (e.g., stereo signals 244) based on the content, characteristics or any feature.

DPS 204 can include a signal analyzer 206 for processing or analyzing any sound signal (e.g., incoming stereo signal 244). Signal analyzer 206 can include any combination of hardware and software for determining correlation or decorrelation between one part of a stereo signal 244 and another part of a stereo signal 244. Signal analyzer 206 can monitor, determine or measure correlation between two (or more) parts or channels of an input or incoming audio signal (e.g., stereo signal 244. DPS 204 can include network interfaces (e.g., modems, wired or wireless communication circuits or devices for sending or receiving data over a network or the internet) to communicate with a server 250, RSS 240 or any other device or a service communicating over a network 101.

A stereo signal 244 analyzed or processed by the signal analyzer can include any stereophonic signal that can include a plurality of different audio channels, such as for example a left channel and a right channel. The left and the right channels can include or correspond to different, yet at least partly correlated, signals (e.g., two simultaneous recordings of a musical performance using two microphones directed to different musicians playing the same musical piece). Stereo signal 244 can include any number of internal parts or channels.

Signal analyzer 206 can measure correlation between different channels of the incoming signal (e.g., stereo signal 244). For example, signal analyzer 206 can compare plots of right channel and left channel signals of the stereo signal 244. Signal analyzer 206 can determine a difference between the left channel and the right channel portions of the stereo signal 244 and establish a correlation factor 208 for the two channels. Signal analyzer 206 can establish a correlation 208 (e.g., determine a correlation factor 208 for a stereo signal 244) by comparing the left channel and the right channel signals of a stereo signal 244 over a particular time period (e.g., one or more seconds).

A correlation factor 208 can include one or more values or parameters indicative of a correlation analysis by the signal analyzer 206. A correlation factor 208 can include a value indicative of a degree or an amount of correlation between a left channel of a stereo signal 244 of a recording file 242 and a right channel of the stereo signal 244 of the same recording file 242. Correlation factor 208 can include a value indicative of a degree or an amount of cross-correlation between the left channel and the right channel of the stereo signal 244. For example, signal analyzer 206 can determine a value or a measure of similarity between the left channel and the right channel when the two are plotted or played in real time (e.g., without any temporal offsets or adjustments introduced by the signal analyzer 206).

Signal analyzer can determine whether a stereo signal 244 is correlated or not correlated by comparing a correlation factor 208 of the two channels of the stereo signal 244 against a correlation threshold 210. For example, a correlation threshold 210 can include a threshold value for identifying if a stereo signal 244 is sufficiently correlated so as to be processed by a DC 230 using a first setting 214 for correlated stereo signals 244 (e.g., podcasts) or is sufficiently uncorrelated so as to be processed by the DC 230 using a second setting 214 for uncorrelated signals (e.g., a classical music recording). Signal analyzer 206 can include and utilize any number of correlation thresholds 210, such as correlation thresholds of increased magnitude or value, to compare correlation factors 208 and identify settings 214 for the DC 230. For example, a signal analyzer 206 can compare a correlation factor 208 against three correlation thresholds 210. Signal analyzer 206 can determine that correlation factor 208 is exceeds two lower value correlation thresholds 210, but does not exceed the third correlation threshold 210. Signal analyzer 206 can have the setting selector 212 select a setting 214 corresponding to the correlation factor 208 in that particular signal correlation range.

Setting selector 212 can include any combination of hardware and software for selecting settings 214 for a DC 230. Setting selector 212 can include functionality for selecting a setting based on correlation factor 208 determined by a signal analyzer 206. Setting selector 212 can determine a setting 214 in response to a correlation factor 208 exceeding a threshold 210. Setting selector 212 can determine a setting 214 in response to a correlation factor 208 exceeding a first correlation threshold 210, but not exceeding a second correlation threshold 210 corresponding to a correlation value that is higher than the first correlation threshold 210. Setting selector 212 can then select a middle of the three settings 214 for the recording file 242 of the stereo signal 244, in response to the correlation factor 208 exceeding a first (e.g., lower) correlation threshold 210, but not exceeding the higher correlation threshold 210 (e.g., thereby falling in the mid-range with respect to the two thresholds 210).

Setting selector 212 can select settings using a lookup table 224. The lookup table 224 can include any array of values allowing for identifying a setting 214 using via an indexing operation. For example, a lookup table can include a range of correlation thresholds 210 corresponding to one or more settings 214 for the setting selector 212 to choose. Setting selector 212 can compare the correlation factor 208 value determined by the signal analyzer 206 by comparing two channels of a stereo signal 244 against one or more correlation thresholds 210 in the lookup table 224. Once the correct correlation threshold 210 is identified, setting selector 212 can identify or select the setting 214 corresponding to the identified correlation threshold 210. Setting selector 212 can determine the setting 214 by identifying a parameter corresponding to the setting 214 from the lookup table 224, based on the correlation factor 208 and correlation thresholds 210 stored in the lookup table 224.

Setting selector 212 can select settings using a lookup table 224 storing recording types 222. For example, a lookup table 224 can store values or parameters corresponding to types 222 of recording files 242, such as a first parameter or a value corresponding to classical music recording files 242, a second parameter or a value corresponding to a talk show or a podcast recording file 242, a third parameter value or a value corresponding to a rock music recording file 242 and so on. Recording file 242 can include a pre-recorded file (e.g., a musical piece) or a real-time (e.g. live) program being not pre-recorded, but rather broadcast live. Each of the values or parameters for each recording type 222 can correspond to a particular setting 214 in the lookup table 224. Setting selector 212 can therefore receive metadata 220 of a recording file 242 identifying the recording type 222, and using the metadata 220 identify a setting 214 from the lookup table 224 to be applied to configure or operate the DC 230 in a particular sound setting.

Setting selector 212 can utilize an audio model 216 to determine a setting 214 for a DC 230. Audio model 216 can include any type and form of a model for determining a correlation factor 208 of a recording file 242 or a setting 214 for a DC 230. For example, audio model 216 can utilize artificial intelligence (AI) or machine learning (ML) functionality to generate, determine, select or identify a correlation factor 208 of a stereo signal 244. For example, audio model 216 can utilize AI or ML functionality to generate, determine, select or identify a setting 214 for operating DC 230 during the processing of the stereo signal 244 corresponding to a particular recording file 242.

Audio model 216 can include any combination of hardware and software for modeling or simulating content adaptive processing of stereo signal 244 in a VAS 202. Audio model 216 can include a model for determining a correlation factor 208 corresponding to a correlation or a cross-correlation between two channel outputs in a single stereo signal 244. Audio model 216 can include a model for identifying or determining settings 214 based on any one or more of: a correlation factor 208, correlation threshold 210, metadata 220, stereo signal 244, recording file 242, or recording type 222 input into the audio model 216.

Audio model 216 can include ML scripts, code or sets of instructions or any other AI or ML related functionality. For example, audio model 216 can include one or more similarity or pareto search functions, Bayesian optimization functions, neural network-based functions or any other optimization functions or approaches. Audio model 216 can include an artificial neural network (ANN) function or a model, such as any mathematical model composed of several interconnected processing neurons as units. The neurons and their connections can be trained with data, such as any input data (e.g., a correlation factor 208, correlation threshold 210, metadata 220, stereo signal 244, recording file 242, or recording type 222). The neurons and their connections can represent the relations between inputs and outputs. Inputs and outputs can be represented with or without the knowledge of the exact information of the system model. For example, audio model 216 can be trained by model trainer 252 using neuron by neuron (NBN) algorithm.

Metadata function 218 can include any combination of hardware and software for acquiring, receiving and processing metadata 220 of a recording file 242 corresponding to a stereo signal 244 being processed. Metadata function 218 can include the functionality to utilize network interface of the EV 105 to communicate, via network 101, with a RSS 240 and acquire metadata 220 on the recording file 242 corresponding to the stereo signal 244. Metadata function 218 can analyze metadata 220 and send it to the setting selector 212 or the audio model 216 to be used for determination or selection of the setting 214 for the DC 230.

Decorrelation circuit (DC) 230 can include any combination of hardware and software for generating one or more audio output signals 234 from an input stereo signal 244. DC 230 can include circuitry or a filter for transforming a stereo signal 244 into one or more stereophonic or monophonic signal outputs (e.g., audio output signals 234). DC 230 can include a settings selector 212 to determine settings 214. DC 230 can receive settings 214 from the DPS 204. DC 230 can receive correlation factors 208 from the DPS 204 and determine or select the settings 214 using the correlation factors 208 received from the DPS 204. DC 230 and DPS 204 can be communicatively coupled and exchange any data or information (e.g., metadata 220, recording files 242, recording types 222, lookup tables 224, correlation factors 208, correlation thresholds 210 or settings 214).

DC 230 can transform, modify, alter or otherwise change the audio output signals 234 based on settings 214. DC 230 can include the functionality for performing any type of signal mixing, including up-mixing (e.g., generating a combined output audio signal from multiple input audio signals) or down-mixing (e.g., generating multiple output audio signals from a single input audio signal). For example, DC 230 can change a single channel signal portion of a stereo signal 244 to provide a time shifted or temporally adjusted or offset surround output 316. For example, DC 230 can utilize signal generator 232 to transform, generate or change one or more channel signal portions of a stereo signal 244 in order to generate or create a new stereo output 314. The new stereo output (e.g., 314) can be modified using DC 230 operation based on particular settings 214. Signal generator 232 can generate from the incoming stereo signal 244 one or more mono signals 318, stereo outputs 314 or surround outputs 316. Signal generator 232 can provide multiple signal outputs for multiple speakers 320 based on the settings 214.

Signal generator 232 can introduce time shifting (e.g., temporal offsets) between various signals for various speakers, in response to the settings 214. For example, a first setting 214 can cause the signal generator 232 of the DC 230 to maintain or improve high correlation of an incoming stereo signal 244 (e.g., recording file 242 corresponding to a podcast) and not introduce any temporal shifting between the channels of the signal 244. For example, a second setting 214 can cause the signal generator 232 of the DC 230 to maintain or improve uncorrelated feature of an incoming stereo signal 244 (e.g., recording file 242 corresponding to a classical music recording) and introduce temporal shifting between the channels of the signal 244.

Server 250 can include any combination of hardware and software for providing functionality (e.g., communication applications or functions) for communicating with an EV 105 or a DPS 204. Server 250 can include a computing device 500 and can include or operate on one or more servers (physical or virtual) and communicate over any network device. Server 250 can function or operate as an application on a cloud or virtual private network service, including for example, a software as a service (SaaS) application. Server 250 can provide audio models 216 to a fleet of EVs 105 and provide updated models 216 to the EVs 105. Server 250 can include network interfaces (e.g., modems, wired or wireless communication circuits or devices for sending or receiving data over a network or the internet) to communicate with EV 105, DPS 204, or any other device communicating over a network 101.

Audio model trainer 252 can include any combination of hardware and software for training an audio model 216. Audio model trainer 252 can include scripts, functions and computer code stored in memory or operating on a processor (e.g., 310) for training audio model 216 or any of its internal functions or functionality. Audio model trainer 252 can include the functionality to generate or train the audio model 216 across a range of values corresponding to any input (e.g., a correlation factor 208, correlation threshold 210, metadata 220, stereo signal 244, recording file 242, or recording type 222). Audio model trainer 252 can include the functionality to generate or train an audio model 216 to identify correlation factors 208 and compare them against correlation thresholds 210. Audio model trainer 252 can include the functionality to generate or train an audio model 216 to identify settings 214. Audio model trainer 252 can train the model 216 to identify settings 214 using metadata 220 of a recording file 242 or recording types 222.

Audio model trainer 252 can perform the training using an artificial intelligence ("AI") or machine learning ("ML") functions or techniques to find relationship function between the input values and the output (e.g., derate factor 445 or current limit 480). For example, audio model trainer 252 can include any combination of supervised learning, unsupervised learning, or reinforcement learning. Audio model trainer 252 can include the functionality including or corresponding to linear regression, logistic regression, a decision tree, support vector machine, Naïve Bayes, k-nearest neighbor, k-means, random forest, dimensionality reduction function, or gradient boosting functions.

Remote streaming service (RSS) 240 can include any combination of hardware and software for providing an audio signal for a VAS 202. RSS 240 can include a streaming service, such as a podcast station or a service, a radio station (e.g., classical music radio station, contemporary music radio station, talk show radio station or any other audio or audio and visual signal source). RSS 240 can include a computing device 500, including a processor 510 executing instructions stored in memories (e.g., 515, 520 or 525) to provide stereo signal 244 to the VAS 202. RSS 240 can provide to VAS 202 recording files 242, such as via real-time streaming or as a file transfer over a network 101. RSS 240 can provide to VAS 202 information or metadata 220 on types of recording files 242 (e.g., recording types 222), identifying the genre of the musical file or type. RSS 240 can provide the VAS 202 with metadata 220 providing any information on the recording file 242, including for example, genre, performer or author identification, name of the recording file 242, quality or bandwidth of the stereo signal 244, or any other information or data on the recording file 242. RSS 240 can receive requests from the DPS 204 or VAS 202 for information on recording files 242 and can provide the metadata 220 or any other requested information in response to the requests.

Figure 3:
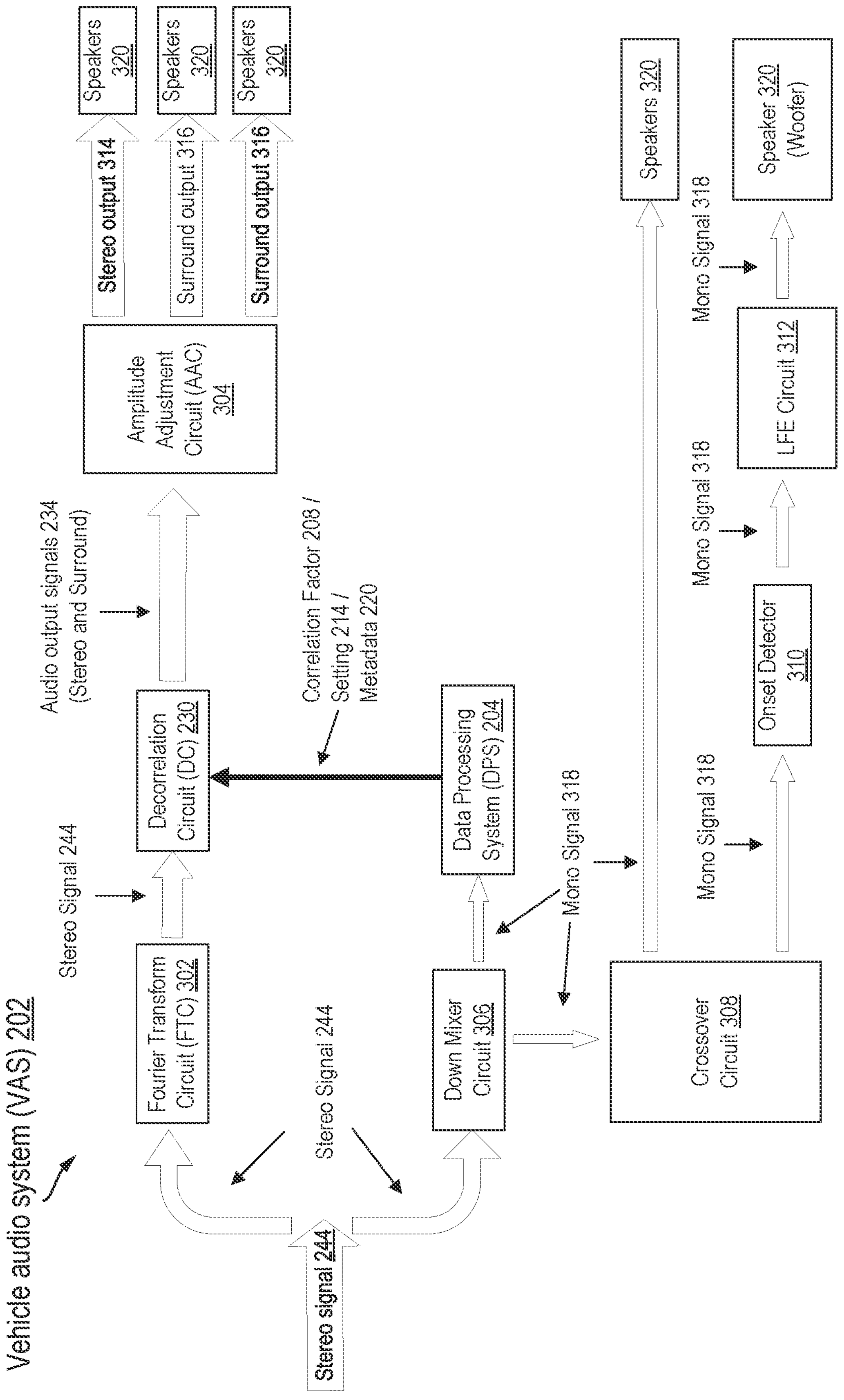
FIG. 3 is a diagram of an audio system for content adaptive stereo signal processing.

FIG. 3 depicts an example of a vehicle audio system (VAS) 202. VAS 202 can include any number of audio processing components, such as one or more fourier transform circuits (FTCs) 302, DCs 230, amplitude adjustment circuits (AACs) 304, down-mixers 306 (or up-mixers), a DPSs 204, crossover circuits 308, onset detectors 310, low frequency effects (LFE) circuits 312 and any number of speakers 320 of various types and sizes that can be deployed or installed around an interior cabin or outside of a vehicle (e.g., EV 105).

VAS 202 can receive a stereo signal 244 from an external source, such as a modem receiving a real-time stream of a recording file 242 (e.g., a pre-recorded musical file or a live-stream of broadcast program). Stereo signal 244 can be input into a FTC 302 to convert the stereo signal 244 into individual spectral components and provide frequency information about the signal. Stereo signal 244 can be output from the FTC 302 (e.g., in frequency domain) and input into a DC 230. Meanwhile, DPS 204 can send to the DC 230 any combination of one or more correlation factors 208, settings 214 or metadata 220. Using the received information, DC 230 can set, adjust, update, configure or reconfigure the operation parameters of the DC 230 to process the incoming (e.g., frequency converted) stereo signal 244 in accordance with the content characteristics of the stereo signal 244.

DC 230 can provide one or more audio output signals 234, which can then be processed by the AAC 304. Audio output signals 234 can include a stereo signal 244, or adjusted mono signals 318. DC 230 can transform or convert the input signal into any combination of audio output signals 234, including for example mono signal 318, another stereo signal 244, a quad signal, or a 5.1 signal. The adjusted mono signals 318 can include one or more time shifted (e.g., temporally offset) or otherwise modified channel signals to create a surround sound effect. The AAC 304 can adjust the amplitude (e.g., volume) or the audio output signals 234 and provide the stereo output 314 signal and one or more surround output 316 signals, which can then be sent to the speakers 320 of the VAS 202.

Stereo signal 244 can also be sent to the down mixer circuit 306 to down mix the signal into mono signals 318. One or more of the mono signals 318 down mixed from the stereo signal 244 can be input into the DPS 204 for processing. In some instances, the stereo signal 244 is input into the DPS 204 for processing. DPS 204 can use the input audio signal (e.g., mono signal 318 or stereo signal 244) to provide for the DC 230 any one or more of correlation factors 208, settings 214, metadata 220 or any other information or data used by the DC 230 to configure or adjust the operation of the DC 230 based on the content of the stereo signal 244.

Mono signal 318 can be input into the crossover circuit 308 to provide one or more mono signal 318 outputs. One or more mono signal 318 outputs can be input into the onset detector 310 and then to the LFE circuit 312 to enhance the low frequency (e.g., sub 120 Hz) sounds. The enhanced low frequency mono signal 318 can be input into a speaker 320 configured for providing a more pronounced low frequency sound (e.g., woofer or sub-woofer). Once processed, output audio signals (e.g., stereo output 314, surround output 316 or mono signal 318) can each be played by one or more speakers of the VAS 202.

In some aspects, the present solution is directed to an audio system, such as a VAS 202 in an EV 105 or any indoor or outdoor sound system for any venue or application. For example, the present solution can include a system 200 illustrated in FIG. 2 that can utilize or include a VAS 202, such as VAS 202 from example 300 in FIG. 3. System 200 can include a VAS 202 deployed or installed in a vehicle (e.g., EV 105 or any motor or transportation vehicle). VAS 202 can include one or more processors 510 of, coupled to, or executing, a DPS 204 coupled with memory (e.g., main memory 515, ROM 520 or storage devices 525). The one or more processors 510 can be configured to provide functionalities or perform actions in accordance with computer code, instructions or commands stored in the main memory 515. The VAS 202 can be configured to provide functionalities or perform actions based on computer code, instructions or commands stored in the memory 515 and circuitry of various components of the VAS 202.

One or more processors 510 can be configured to identify a stereo signal 244 of a VAS 202 of a vehicle 105. One or more processors 510 can be configured to determine a correlation factor 208. Correlation factor 208 can be indicative of correlation between a first portion of the stereo signal 244 (e.g., a left channel) and a second portion of the stereo signal 244 (e.g., a right channel). One or more processors 510 can be configured to select, based on the correlation factor 208, a setting 214 for generating a plurality of audio signals (e.g., audio output signals 234). VAS 202 can be configured to include a decorrelation circuit 230. DC 230 can be configured to generate, based on the stereo signal 244 and according to the setting 214, the plurality of audio signals (e.g., audio output signals 234) for a plurality of speakers 320 in the vehicle 105.

One or more processors 510 can be configured to receive, from a remote streaming service 240, metadata 220 for a recording 242 (e.g., recording file 242) corresponding to the stereo signal 244. One or more processors 510 can be configured to identify, based on the metadata 220, a type of recording (e.g., recording type 222) corresponding to the stereo signal 244 or the recording file 242 associated with the stereo signal 244. One or more processors 510 can be configured to select the correlation factor 208 according to the type of the recording (e.g., 222).

One or more processors 510 can be configured to determine the correlation (e.g., correlation factor 208) between the first portion (e.g., first channel) of the stereo signal 244 over a time period and the second portion (e.g., second channel) of the stereo signal of the time period does not exceed a correlation threshold 210. The time period can include a period of one or more milliseconds or seconds. One or more processors 510 can be configured to select the setting 214 based on the correlation (e.g., correlation factor 208) not exceeding the correlation threshold 210. The decorrelation circuit 230 can be configured to generate, according to the setting 214, a first audio signal (e.g., audio output signal 234, stereo output 314 or surround output 316) from the plurality of audio signals (audio output signals 234) for a first speaker 320 of the plurality of speakers 320 temporally offset (e.g., time or frequency shifted) from a second audio signal (e.g., audio output signal 234, stereo output 314 or surround output 316) of the plurality of audio signals for a second speaker 320 of the plurality of speakers 320.

One or more processors 510 can be configured to determine that the correlation (e.g., correlation factor 208) between the first portion (e.g., first channel) of the stereo signal 244 over a time period and the second portion (e.g., second channel) of the stereo signal 244 of the time period exceeds a correlation threshold 210. One or more processors 510 can be configured to select the setting 214, based on the correlation (e.g., correlation factor 208) exceeding the correlation threshold 210. The decorrelation circuit 230 can be configured to generate, according to the setting 214, a first audio signal (e.g., audio output signal 234) from the plurality of audio signals for a first speaker 320 of the plurality of speakers 320 temporally aligned (e.g., not time or frequency shifted) with respect to a second audio signal (e.g., audio output signal 234) of the plurality of audio signals for a second speaker 320 of the plurality of speakers 320.

One or more processors 510 can be configured to identify a lookup table 224 indicative of a metadata 220 corresponding to the setting 214. One or more processors 510 can be configured to identify, via the lookup table 224, the metadata 220 of the stereo signal 244 indicative of a type of recording (e.g., 222) corresponding to the stereo signal 244. One or more processors 510 can be configured to select the setting 214 according to the metadata 220. One or more processors 510 can be configured to determine the correlation factor 208 based on the first portion of the stereo signal 244 and the second portion of the stereo signal 244 input into an audio model 216. The audio model 216 can be trained by an audio model trainer 252 via machine learning. One or more processors 510 can be configured to select the setting using the audio model 216. For example, any one or more of a: correlation factor 208, stereo signal 244, recording file 242 or metadata 220 (e.g., identifying recording type 222) can be input into an audio model 216, and the audio model 216 can determine the setting 214 for the DC 230.

One or more processors 510 can be configured to determine the setting 214 based on the first portion of the stereo signal 244 and the second portion of the stereo signal 244 input into an audio model 216 trained via machine learning. The decorrelation circuit 230 can be configured to generate, according to the setting 214, a first audio signal of the plurality of audio signals (e.g., audio output signal 234) to a first speaker 320 of the plurality of speakers 320 and a second audio signal (e.g., audio output signal 234) of the plurality of audio signals to a second speaker 320 of the plurality of speakers 320.

One or more processors 510 can be configured to determine the setting 214 based on the first portion of the stereo signal 244 and the second portion of the stereo signal 244 input into a audio model 216 trained via machine learning. The audio model 216 can be trained to identify a user preference for the setting 214 according to a type of a recording associated with the stereo signal 244. The type of recording can correspond to one of a recording of a speech or recording of a music.

One or more processors 510 can be configured to determine the setting 214 indicative of a volume for the plurality of audio signals output from the plurality of speakers 320. The setting 214 can be determined based on the first portion of the stereo signal 244 and the second portion of the stereo signal 244 input into an audio model 216 trained via machine learning. The plurality of speakers 320 can be configured to provide sound corresponding to the plurality of audio signals in accordance with the volume.

In some aspects, the present solution can be directed to any transportation vehicle, such as an EV 105. The vehicle can include a VAS 202 of a vehicle (e.g., 105). The vehicle can include one or more processors 510 coupled with memory (e.g., 510, 515 or 520). One or more processors 510 can be configured to identify a stereo signal 244 of an audio system of a vehicle (e.g., VAS 202). One or more processors 510 can be configured to determine a correlation factor 208 indicative of correlation between a first portion (e.g., first channel) of the stereo signal 244 and a second portion (e.g., second channel) of the stereo signal 244. One or more processors 510 can be configured to select, based on the correlation factor 208, a setting 214 for generating a plurality of audio signals (e.g., audio output signals 234). VAS 202 can include a decorrelation circuit configured to generate, based on the stereo signal 244 and according to the setting 214, the plurality of audio signals (e.g., 234). VAS 202 can include a plurality of speakers 320 in the vehicle to provide sound according to the plurality of audio signals (e.g., 234).

The vehicle (e.g., EV 105) can include the one or more processors 510 that are configured to determine the correlation factor 208 based on one of: a metadata 220 of a recording (e.g., 242) corresponding to the stereo signal 244, or a determination of whether the correlation (e.g., correlation factor 208) exceeds a correlation threshold 210. The vehicle can determine the correlation factor 208 or setting 214 using the audio model 216, such as by inputting any one or more of recording file 242, metadata 220, recording type 222 or stereo signal 244 into the audio model 216. DPS 204, DC 230 or audio model 216 can utilize one or more lookup tables 224 to determine the correlation factor 208 comparison with the correlation threshold 210

Figure 4:
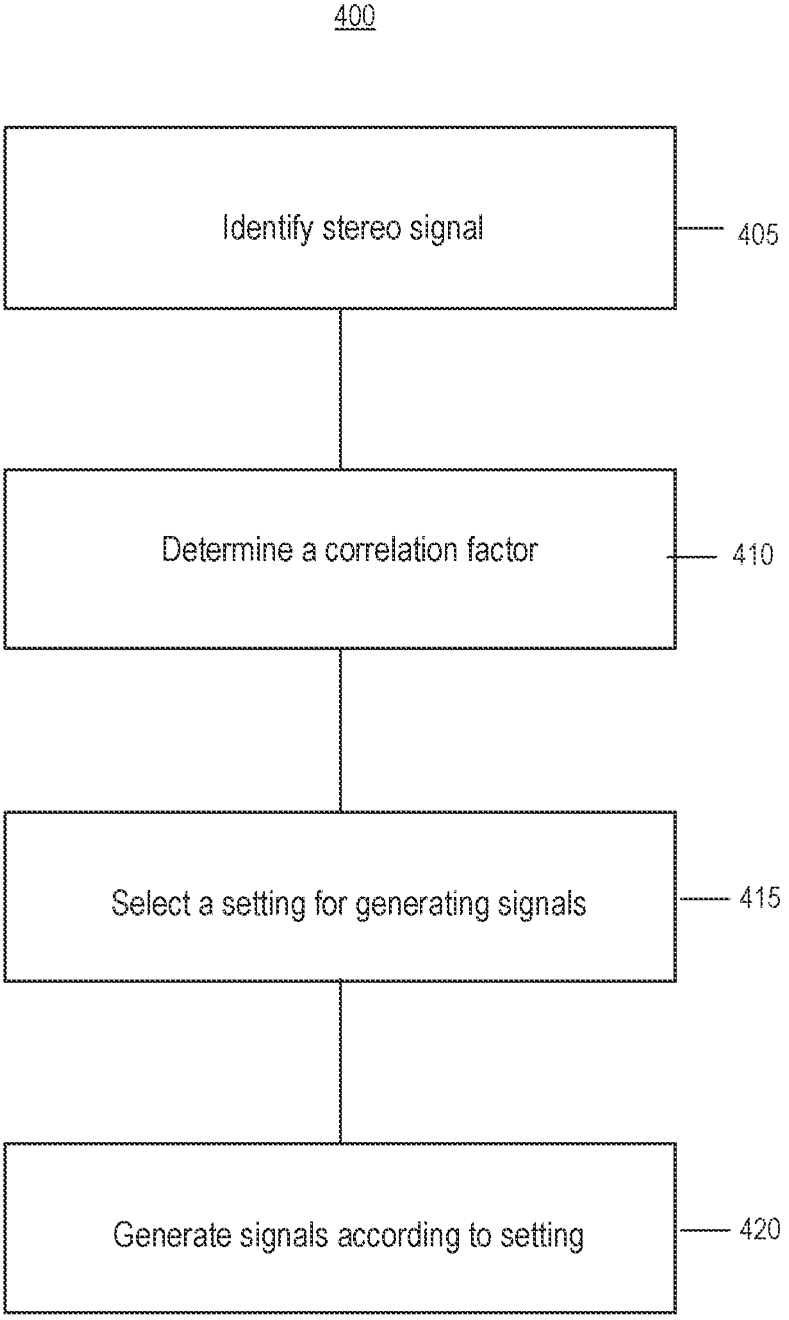
FIG. 4 is a flow diagram of an example method of content adaptive stereo signal processing.

FIG. 4 illustrates a method 400 of content based or content adaptive processing of an audio signal, such as a stereo signal. The method 400 can be implemented using a system 200 depicted in FIG. 2 combined with a VAS 202 from example 300 to transform or generate output audio signals, via a decorrelation circuit or a filter, based on characteristics (e.g., metadata or correlation of channel signals) corresponding to the incoming stereo signal. The method can include ACTS 405-420. At ACT 405, a data processing system can identify a stereo signal. At ACT 410, the data processing system can determine a correlation factor. At ACT 415, the data processing system can select a setting for generating signals. At ACT 420, a decorrelation circuit or a filter can generate output audio signals according to the setting.

At ACT 405, a data processing system can identify a stereo signal. The method can include the DPS identifying a stereo signal. The DPS can receive any number and any type of incoming audio signals, including, for example, any number of mono or stereo signals. The stereo signal can include any stereo signal of any device, system or a venue, including any indoor or outdoor sound system or an audio system of a vehicle. Stereo signal can include a plurality of channels. Stereo signal can correspond to any type of audio file or a program that is broadcast or streamed live or pre-recorded, including any musical recordings or songs (e.g., classical music, jazz music, rock or dance music), or a talk show program, a podcast or any other audio program.

The DPS can receive, from a remote streaming service, metadata for a recording corresponding to the stereo signal. The metadata can include information on the recording file or audio program type (e.g., recording type), source, or any other information. The DPS can receive or identify a lookup table. The lookup table can include entries corresponding to, or indicative of, a metadata that can correspond to settings for the decorrelation circuit. For example, a lookup table can include entries of metadata (e.g., recording types) and settings 214. The lookup table can include entries for identifying settings for the decorrelation circuit based on correlation factors. For example, the data processing system can identify, via the lookup table, the metadata of the stereo signal indicative of a type of recording and corresponding to the stereo signal.

At ACT 410, the data processing system can determine a correlation factor. The method can include the data processing system determining a factor indicative of correlation between a first portion of the stereo signal and a second portion of the stereo signal. For example, the data processing system can utilize a signal analyzer to identify internal portions of the incoming stereo signal, such as channels of the stereo signal. The data processing system can receive the stereo signal in time domain or can receive the stereo signal in the frequency domain from a fourier transform circuit. The data processing system can compare the frequency domain converted channels of the stereo signal to identify correlation between the channels. The comparison can be over any time period, such as one second, 10 seconds, 30 seconds or entire length of the recording file.

The data processing system can determine the correlation (e.g., correlation factor) between the first portion of the stereo signal over a time period and the second portion of the stereo signal of the time period does not exceed a correlation threshold. The data processing system can determine that the correlation between the first portion of the stereo signal over a time period and the second portion of the stereo signal of the time period exceeds a correlation threshold. The data processing system can determine that the correlation factor exceeds a first correlation threshold, but remains below a second correlation threshold. The data processing system can determine the correlation factor based on the first portion of the stereo signal and the second portion of the stereo signal input into a model trained via machine learning.

At ACT 415, the data processing system can select a setting for generating signals. The method can include the data processing system selecting, based on the factor, a setting for generating a plurality of audio signals. The data processing system can identify a type of recording corresponding to the stereo signal. The data processing system can select the factor according to the type of the recording. The data processing system can select the setting, based on the correlation (e.g., correlation factor) not exceeding the correlation threshold. The data processing system can select the setting, based on the correlation (e.g., correlation factor) exceeding the correlation threshold. The data processing system can select the setting based on the correlation factor exceeding a first correlation threshold and not exceeding a second correlation threshold.

The data processing system can select the setting according to the metadata. For example, the metadata can identify the recording type as a classical music piece and the data processing system can identify or select the setting corresponding to this particular recording type (e.g., classical music pieces). For example, the metadata can identify the recording type as a podcast or a talk show and the data processing system can identify or select the setting corresponding to this particular recording type (e.g., podcasts or talk shows). The data processing system can select the setting using the audio model. For example, the metadata can be input into the audio model and the audio model can identify the setting 214 based on the metadata input.

The data processing system can determine the setting based on the first portion of the stereo signal and the second portion of the stereo signal input into a model trained via machine learning. The data processing system can determine the setting based on the first portion of the stereo signal and the second portion of the stereo signal input into a model trained via machine learning. The model (e.g., audio model) can be trained to identify a user preference for the setting according to a type of a recording associated with the stereo signal, the type of recording corresponding to one of a recording of a speech or recording of a music. The data processing system can determine the setting indicative of a volume for the plurality of audio signals output from the plurality of speakers based on the first portion of the stereo signal and the second portion of the stereo signal input into a model trained via machine learning.

At ACT 420, a decorrelation circuit or a filter can generate output audio signals according to the setting. The method can include the decorrelation circuit generating, based on the stereo signal and according to the setting, the plurality of audio signals for a plurality of speakers in the vehicle. The decorrelation circuit can perform mixing of the input stereo signal, such as up-mixing or down-mixing. The decorrelation circuit can generate, according to the setting, a first audio signal from the plurality of audio signals for a first speaker of the plurality of speakers and a second audio signal of the plurality of audio signals for a second speaker of the plurality of speakers. The first and the second audio signals can be the same or different. The first and the second audio signals can be temporally offset (e.g., time shifted) from each other. The first and the second audio signals can have their volume amplified at same or different levels.

The decorrelation circuit can generate, according to the setting, a first audio signal from the plurality of audio signals for a first speaker of the plurality of speakers temporally aligned with a second audio signal of the plurality of audio signals for a second speaker of the plurality of speakers. For example, a decorrelation circuit can generate, according to the setting, a first audio signal from the plurality of audio signals for a first speaker of the plurality of speakers temporally offset from a second audio signal of the plurality of audio signals for a second speaker of the plurality of speakers. For example, the decorrelation circuit can generate two or more same signals for two or more speakers. For example, the decorrelation circuit can generate two or more different (e.g., time offset, differently amplified or independently processed) signals for two or more speakers. The decorrelation circuit can provide, according to the setting, a first audio signal of the plurality of audio signals to a first speaker of the plurality of speakers and a second audio signal of the plurality of audio signals to a second speaker of the plurality of speakers. The plurality of speakers can output corresponding to the plurality of audio signals in accordance with the volume.

Figure 5:
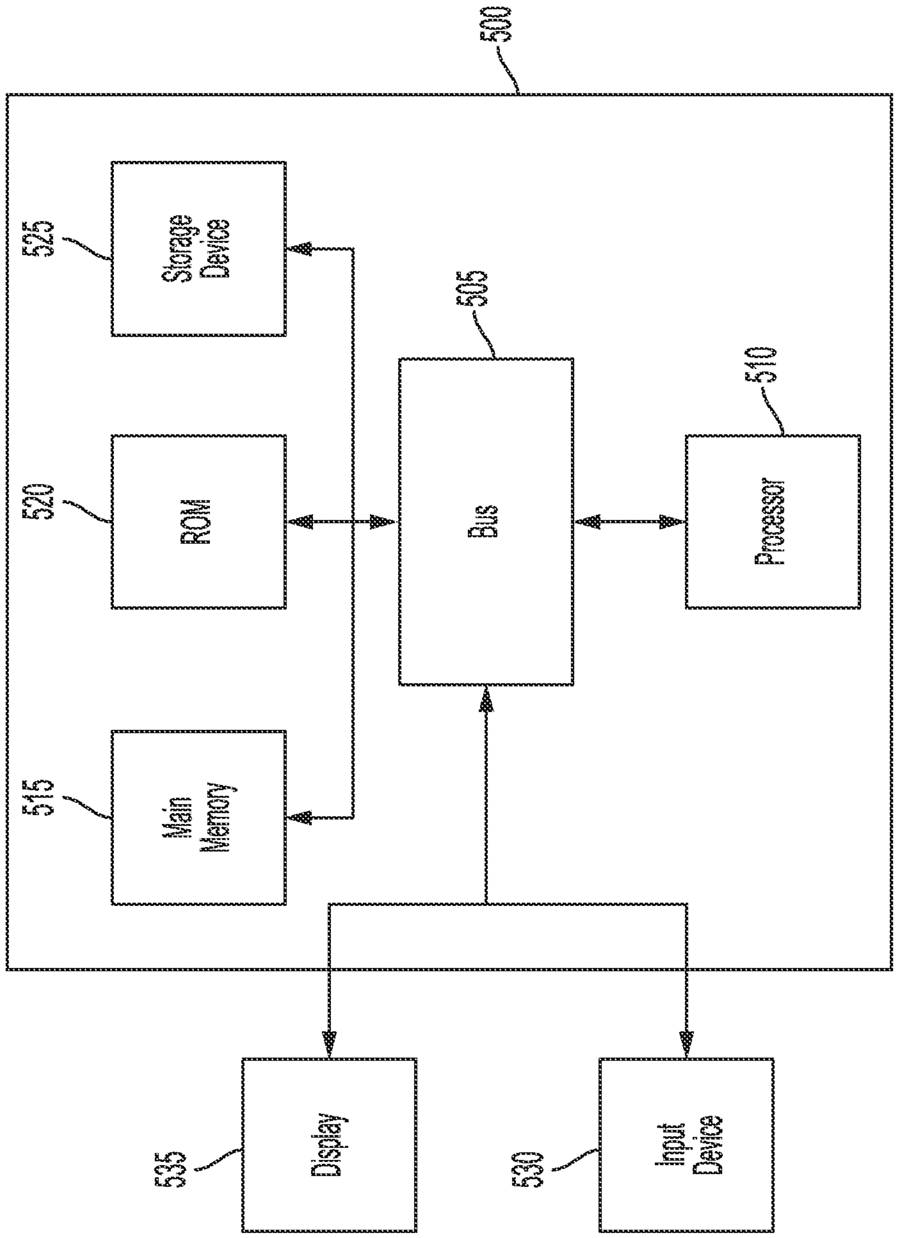
FIG. 5 is a block diagram illustrating an architecture for a computer system that can be employed to implement elements of the systems and methods described and illustrated herein.

FIG. 5 depicts an example block diagram of an example computer system 500. The computer system or computing device 500 can include or be used to implement a data processing system or its components. The computing system 500 includes at least one bus 505 or other communication component for communicating information and at least one processor 510 or processing circuit coupled to the bus 505 for processing information. The computing system 500 can also include one or more processors 510 or processing circuits coupled to the bus for processing information. The computing system 500 also includes at least one main memory 515, such as a random access memory (RAM) or other dynamic storage device, coupled to the bus 505 for storing information, and instructions to be executed by the processor 510. The main memory 515 can be used for storing information during execution of instructions by the processor 510. The computing system 500 may further include at least one read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions.

The computing system 500 may be coupled via the bus 505 to a display 535, such as a liquid crystal display, or active matrix display, for displaying information to a user such as a driver of the electric vehicle 105 or other end user. An input device 530, such as a keyboard or voice interface may be coupled to the bus 505 for communicating information and commands to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, a positive or a negative terminal of a battery, or power direction when an electric vehicle is charged or discharged. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An audio system in a vehicle, comprising:

one or more processors of a data processing system coupled with memory to:

identify a stereo signal of the audio system of the vehicle;

determine a factor indicative of correlation between a first portion of the stereo signal and a second portion of the stereo signal;

determine that the correlation between the first portion of the stereo signal and the second portion of the stereo signal over a time period exceeds a correlation threshold; and select, based on the factor and the correlation exceeding the correlation threshold, a setting to generate a plurality of audio signals; and a decorrelation circuit to:

generate, based on the stereo signal and according to the setting, a first audio signal of the plurality of audio signals for a first speaker of a plurality of speakers in the vehicle, and the first audio signal temporally aligned with a second audio signal of the plurality of audio signals for a second speaker of the plurality of speakers.

2. The audio system of claim 1, comprising the one or more processors to:

receive, from a remote streaming service, metadata for a recording corresponding to the stereo signal;

identify, based on the metadata, a type of the recording corresponding to the stereo signal; and select the factor according to the type of the recording.

3. The audio system of claim 1, comprising the one or more processors to:

identify a lookup table indicative of a metadata corresponding to the setting;

identify, via the lookup table, the metadata of the stereo signal indicative of a type of recording corresponding to the stereo signal; and select the setting according to the metadata.

4. The audio system of claim 1, comprising the one or more processors to:

determine the factor based on the first portion of the stereo signal and the second portion of the stereo signal being input into a model trained via machine learning; and select, using the model, the setting.

5. The audio system of claim 1, comprising:

the one or more processors to:

determine the setting based on the first portion of the stereo signal and the second portion of the stereo signal being input into a model trained via machine learning.

6. The audio system of claim 1, comprising the one or more processors to:

determine the setting based on the first portion of the stereo signal and the second portion of the stereo signal being input into a model trained via machine learning, the model trained to identify a user preference for the setting according to a type of a recording associated with the stereo signal, the type of the recording corresponding to one of a first recording of a speech or a second recording of a music.

7. The audio system of claim 1, comprising:

the one or more processors to;

determine the setting indicative of a volume for the plurality of audio signals output from the plurality of speakers, the setting determined based on the first portion of the stereo signal and the second portion of the stereo signal being input into a model trained via machine learning; and the plurality of speakers to provide sound corresponding to the plurality of audio signals in accordance with the volume.

8. A method, comprising:

identifying, by a data processing system, a stereo signal of a vehicle;

determining, by the data processing system, a factor indicative of correlation between a first portion of the stereo signal and a second portion of the stereo signal;

determining, by the data processing system, that the correlation between the first portion of the stereo signal and the second portion of the stereo signal over a time period exceeds a correlation threshold;

selecting, by the data processing system, based on the factor and the correlation exceeding the correlation threshold, a setting for generating a plurality of audio signals; and generating, by a decorrelation circuit, based on the stereo signal and according to the setting, a first audio signal of the plurality of audio signals for a first speaker of a plurality of speakers in the vehicle, and the first audio signal temporally aligned with a second audio signal of the plurality of audio signals for a second speaker of the plurality of speakers.

9. The method of claim 8, comprising:

receiving, by the data processing system, from a remote streaming service, metadata for a recording corresponding to the stereo signal;

identifying, by the data processing system, a type of the recording corresponding to the stereo signal; and selecting, by the data processing system, the factor according to the type of the recording.

10. The method of claim 8, comprising:

identifying, by the data processing system, a lookup table indicative of a metadata corresponding to the setting;

identifying, by the data processing system via the lookup table, the metadata of the stereo signal indicative of a type of recording corresponding to the stereo signal; and selecting, by the data processing system, the setting according to the metadata.

11. The method of claim 8, comprising:

determining, by the data processing system, the factor based on the first portion of the stereo signal and the second portion of the stereo signal being input into a model trained via machine learning; and selecting, by the data processing system using the model, the setting.

12. The method of claim 8, comprising:

determining, by the data processing system, the setting based on the first portion of the stereo signal and the second portion of the stereo signal being input into a model trained via machine learning.

13. The method of claim 8, comprising:

determining, by the data processing system, the setting based on the first portion of the stereo signal and the second portion of the stereo signal being input into a model trained via machine learning, the model trained to identify a user preference for the setting according to a type of a recording associated with the stereo signal, the type of recording corresponding to one of a recording of a speech or recording of a music.

14. The method of claim 8, comprising:

determining, by the data processing system, the setting indicative of a volume for the plurality of audio signals output from the plurality of speakers based on the first portion of the stereo signal and the second portion of the stereo signal being input into a model trained via machine learning; and providing, by the plurality of speakers, output corresponding to the plurality of audio signals in accordance with the volume.

15. A vehicle, comprising:

an audio system of the vehicle, comprising:

one or more processors coupled with memory to:

identify a stereo signal of the audio system of the vehicle;

determine a factor indicative of correlation between a first portion of the stereo signal and a second portion of the stereo signal;

determine that the correlation between the first portion of the stereo signal and the second portion of the stereo signal over a time period exceed a correlation threshold; and select, based on the factor and the correlation exceeding the correlation threshold, a setting for generating a plurality of audio signals; and a decorrelation circuit to:

generate, based on the stereo signal and according to the setting, the plurality of audio signals, a first audio signal from the plurality of audio signals for a first speaker of a plurality of speakers in the vehicle, and the first audio signal temporally aligned with a second audio signal of the plurality of audio signals for a second speaker of the plurality of speakers.

* * * * *